US007129983B2

(12) United States Patent
Rantanen et al.

(10) Patent No.: US 7,129,983 B2
(45) Date of Patent: Oct. 31, 2006

(54) CONTROL OF A FLASH UNIT IN A DIGITAL CAMERA

(75) Inventors: Henry Rantanen, Tampere (FI); Jukka Yrjänäinen, Ylöjärvi (FI)

(73) Assignee: Nokia Corporation, Espoo (FI)

( * ) Notice: Subject to any disclaimer, the term of this patent is extended or adjusted under 35 U.S.C. 154(b) by 669 days.

(21) Appl. No.: 10/161,109

(22) Filed: May 31, 2002

(65) Prior Publication Data

US 2003/0007088 A1 Jan. 9, 2003

(30) Foreign Application Priority Data

Jun. 1, 2001 (FI) .................................. 20011155

(51) Int. Cl.
*H04N 5/222* (2006.01)
*G03B 9/70* (2006.01)

(52) U.S. Cl. ...................................... 348/371; 396/173

(58) Field of Classification Search ................ 348/370, 348/371; 396/106, 107, 109, 110, 173, 182
See application file for complete search history.

(56) References Cited

U.S. PATENT DOCUMENTS

| 4,284,333 | A |   | 8/1981  | Kawamura et al. |           |
|-----------|---|---|---------|-----------------|-----------|
| 5,752,097 | A | * | 5/1998  | McIntyre        | 396/157   |
| 6,278,490 | B1| * | 8/2001  | Fukuda et al.   | 348/362   |
| 6,404,987 | B1| * | 6/2002  | Fukui           | 396/56    |
| 6,584,283 | B1| * | 6/2003  | Gabello et al.  | 396/109   |
| 6,654,062 | B1| * | 11/2003 | Numata et al.   | 348/362   |
| 6,856,356 | B1| * | 2/2005  | Kahn            | 348/371   |
| 2002/0080254 | A1 | * | 6/2002  | Parulski      | 348/333.01 |
| 2003/0030744 | A1 | * | 2/2003  | Baer          | 348/370   |
| 2003/0062582 | A1 | * | 4/2003  | Blerkom       | 257/443   |
| 2004/0223075 | A1 | * | 11/2004 | Furlan et al. | 348/363   |

(Continued)

FOREIGN PATENT DOCUMENTS

EP         0989741         3/2000

(Continued)

*Primary Examiner*—Vivek Srivastava
*Assistant Examiner*—Justin Misleh
(74) *Attorney, Agent, or Firm*—Alfred A. Fressola; Ware, Fressola Van Der Sluys & Adolphson LLP

(57) ABSTRACT

The invention is based on a method for controlling a flash unit in connection with a digital image sensor without a mechanical shutter, wherein the exposure of the image sensor is performed in sub-areas, such as pixel rows or columns, or in another order, by using a rolling electronic shutter or the like. Thus, the exposure of said sub-areas of the image sensor takes place at least partly at different times. According to the invention, during the time of exposure of one image, i.e. substantially all the sub-areas of the image sensor, several discrete, successive flashes of the flash unit are used to achieve even exposure of the image area, which the flashes are timed in such a way that each single flash is triggered at a point of time which is common to the integration or exposure time of as many successive sub-areas of the image sensor as possible. According to the invention, the successive light flashes are also timed in such a way that one and only one flash of the flash unit occurs during the integration or exposure time of each single sub-area. By the present invention, the significant advantage is attained that the invention minimizes the number of light flashes required for one image while it also secures that each sub-area of the sensor to be exposed at a different time is illuminated as evenly as possible.

27 Claims, 4 Drawing Sheets

U.S. PATENT DOCUMENTS

2005/0057674 A1* 3/2005 Krymski et al. ............ 348/296

FOREIGN PATENT DOCUMENTS

| EP | 001263215 A2 * | 4/2002 |
| JP | 09312799 | 12/1997 |
| JP | 2000196951 | 7/2000 |
| JP | 2000262677 | 9/2000 |
| WO | 9905853 | 2/1999 |

* cited by examiner

CONTROL OF A FLASH UNIT IN A DIGITAL CAMERA

CROSS-REFERENCE TO RELATED APPLICATIONS

Priority is claimed from Finnish application 20011155 filed 1 Jun. 2001.

FIELD OF THE INVENTION

The invention relates to a method for controlling the operation of a flash unit in connection with an electronic image sensor operating without a separate external shutter.

BACKGROUND OF THE INVENTION

Digital image sensors based on semiconductor technology, such as matrix sensors based on charge coupled devices (CCD) and complementary metal oxide semiconductor (CMOS) technology, now make it possible to provide a large variety of devices with built-in imaging functions. Such image sensors are used e.g. in digital video and still cameras intended for consumers, as well as in various camera devices connected to computers, such as so-called network cameras. Thanks to their high degree of integration, compact size and low power consumption, particularly CMOS sensors are also very suitable for use in small-size portable devices, such as mobile stations and so-called personal data assistants (PDA).

Particularly in a situation in which a digital camera, i.e. a digital image sensor, is implemented in a device which is small in size (portable) and/or inexpensive in its sale price, it is important to implement the camera function with structures which are as simple as possible. The aim is thus to minimize the space taken by the camera in the device as well as the power consumption and the total manufacturing costs of the device.

One way to simplify the structure of the digital camera is to eliminate a separate, typically mechanically operated shutter which is used in front of the sensor matrix to control the exposure time. In such shutter-free digital cameras, the exposure time is controlled electronically by controlling the functions of the sensor matrix.

In the following, we shall briefly describe the operation of a CMOS sensor based on the use of an electronic shutter, as well as the problems caused by the use of the electronic shutter in practice.

To put it simply, the CMOS image sensor consists of a matrix of photo-sensitive pixels. When light strikes a single pixel, the pixel is charged with an electric charge which is proportional to the amount of incoming light and is further stored in or in connection with said pixel. To read the pixel value, the charge is converted by means of a charge amplifier to a voltage which is further conducted via an analog-to-digital (AD) conversion out of the image sensor.

The exposure time of a single pixel in the CMOS sensor consists of the time during which the pixel is allowed to integrate the electric charge formed by this incoming light. The integration or exposure time starts at the point of time when the previous charge contained in the pixel is first adjusted to zero by a reset function, and ends when the pixel charge is read by a sample function.

To achieve the best possible image quality, all the pixels of the image sensor should be exposed precisely at the same time. In other words, the above-described operations of resetting, integration and reading should be performed simultaneously for all the pixels in the matrix. However, this will result in a very complex structure of the sensor. Furthermore, the transfer of image information in serial and digital form out of the sensor circuit should use a considerably large bandwidth.

Thus, for the above-mentioned reasons, the solution commonly used is to process a CMOS matrix sensor row by row, i.e. to perform the operations of resetting, integration and reading for one pixel row of the matrix at a time. This makes the sensor structure considerably simpler, and thus also the transfer of the image information out of the sensor circuit will take place naturally in serial form, row by row, wherein the requirements set for the image information transfer rate are easier.

However, the row-by-row processing has the drawback that the different rows of the matrix sensor are now exposed at slightly different times. FIG. 1 shows, in principle, the row-by-row processing of the image sensor and its effect on the exposure of the different rows of the sensor.

To start the integration or exposure time of the rows, the rows are reset one by one with a reset function (R). To keep the exposure times of the rows mutually equal, the resetting (R) of successive rows takes place at the same rate at which the rows will be read with the sample function (S) at a later stage. The period of time between the resetting operations (R) of two successive rows is called row processing time (RP). The minimum value for the row processing time (RP) is determined by the rate at which the sensor circuit can transfer image information out of the circuit. Consequently, the row processing time (RP) also indicates the time which is taken between the sample operations (S) of two successive rows.

The row integration or exposure time (RI) can now be formed of suitable multiples of the row processing time (RP) in such a way that the exposure time (RI) is kept equal for all the rows. In the example of FIG. 1, the time selected for the exposure time is 10× the processing time (RP). After the first row (row 0) has integrated light for said exposure time (RI), the system contained in the circuit will read and convert the image information of the pixels of said row into digital format and output it from the circuit. After this, the image information contained in the next rows in the order will be read and outputted in a corresponding way.

As shown in FIG. 1, image information will not be outputted from the sensor circuit before the point of time $T_2$, because the integration time (RI) of the first row 0 has not expired yet. It can be seen from FIG. 1 that during the period between the points of time $T_1$ and $T_2$, there is a period which is common to the exposure of the rows 0 to 4 but is still shorter than the total exposure time (RI) of a single row. However, for example row 0 and row 11 are exposed at a totally different time. Consequently, the difference in the time of exposure is greatest between the first row 0 and the last row n−1 of the sensor.

Consequently, the exposure/integration times (RI) of adjacent rows of the image sensor, to be processed one after the other, are partly overlapping, but the exposure/integration takes place clearly at different times in rows which are far from each other, for example at the upper and lower edges of the sensor.

Row-by-row processing of the image area in the above-described manner is known from prior art as a rolling electronic shutter or as a rolling window shutter.

When the object to be imaged is substantially immovable in relation to the camera or in a slow motion in relation to the processing time of the whole image area (all the rows), and when the lighting is constant with respect to time, the rolling electronic shutter will not cause considerable harm to the imaging and to the image quality.

However, in a situation in which an electronic flash unit (flash unit) is used for illuminating the object during the imaging, considerable problems will be caused to the image quality by the exposure of the sensor rows at different times. The reason for this is that because of the short flash time specific to the flash unit, the illumination produced by the flash unit will significantly change the time when the whole image area of the sensor is exposed/processed.

For example, the duration of a flash in flash units based on a discharge tube, used in pocket cameras or the like, typically varies from some test of microseconds to some hundreds of microseconds. Correspondingly, in a CMOS sensor with VGA resolution (640×480 pixels), to be processed row by row, the processing of the whole image area typically takes several tens of milliseconds when a rolling electronic shutter is used. Now, as the flash of the flash unit is considerably shorter than the processing of the whole image area, this will cause that different rows of the sensor will be exposed in significantly different ways when the flash unit is used, and therefor, the quality of the images taken with the flash unit is impaired.

SUMMARY OF THE INVENTION

It is the primary aim of the present invention to disclose a method for controlling the operation of a flash unit in connection with a digital image sensor which is to be processed row by row, column by column or another sub-area at a time and which uses a rolling electronic shutter or the like and thereby operates without a separate external shutter. It is a particular aim of the invention to avoid the above-presented problems which impair the image quality due to the disparity between the duration of the flash of the flash unit (light pulse) and the time required for processing the whole image area of the sensor.

This result is accomplished by a method for controlling a flash unit used for illuminating an object to be imaged in connection with an electronic image sensor based on a 2-dimensional pixel matrix, or the like, the exposure of the image sensor being performed in sub-areas, for example pixel rows or columns, or in another order, by using a rolling electronic shutter or the like, wherein the exposure of said sub-areas of the image sensor takes place at least partly at different times, wherein during the time of exposure of one image, i.e. substantially all the sub-areas of the image sensor, several discrete, successive flashes of a flash unit are used to achieve even exposure of the image area, which flashes are timed in such a way that each single flash is performed at a point of time which is common to the integration or exposure time of as many successive sub-areas of the image sensor as possible, and that the successive flashes of the flash unit are also timed in such a way that one and only one flash of the flash unit occurs during the integration or exposure time of each single sub-area.

To attain this purpose, the method according to the invention is primarily characterized in what will be presented in the characterizing part of the independent claim 1.

The other dependent claims present some preferred embodiments of the invention.

The invention is based on the idea that during the time required for exposing one image, several separate, successive light flashes are used instead of a single light flash, to balance the exposure of different sub-areas of the image sensor to be processed at different times and thus integrating the charge at different times.

The basic idea of the invention is that the flashes of the flash unit to be used for a single image are timed so that each single flash of the flash unit is performed at a point of time which is common to the integration or exposure time (RI) of as many successive sub-areas of the sensor as possible, such as rows, to be exposed at a time. Further, the successive flashes are also timed so that one and only one light flash occurs during the exposure time of each sub-area.

The significant advantage is attained by the present invention that it minimizes the number of light flashes required for one image while it also ensures that the object to be imaged is illuminated as evenly as possible during the exposer (RI) of each sub-area of the sensor. The minimization of the number of light flashes is very important particularly in portable and/or other battery-operated devices in which the total power consumption of the flash unit should be kept as low as possible to save the capacity of the batteries and/or to minimize their size.

By using the method of the invention, a very high image quality is also achieved, thanks to the even exposer of the image area. Furthermore, in the case of a moving object to be imaged, the invention effectively prevents blurring of the image caused by the movement of the object, in a way to be described more fully hereinbelow.

In an advantageous embodiment of the invention, in the case of a matrix sensor to be processed row by row, the number of flashes required for one image is determined by means of the ratio between the row processing time (RP) of the matrix sensor and the integration or exposure time (RI) used in the shooting. The ratio RI/RP indicates the number of successive rows which can be covered by one flash of the flash unit.

The flash unit control according to the invention can be used in normal camera shooting with a flash unit under a dark or dim conditions, or also in producing a fill-in flash under illuminated conditions.

Further, the invention can also be applied in the storage of so-called super resolution images. In super resolution images, several successive images in which the object is slightly transferred with respect to the image area are combined by means of image processing into a single new image. The resolution of the combined image is better than the pixel resolution of the original images.

The invention is preferably applied particularly in connection with CMOS image sensors, to produce a simple, compact digital camera with a low power consumption. Such a digital camera is suitable to be placed e.g. in a mobile station or in another corresponding portable personal device.

The following, more detailed description of the invention with examples will more clearly illustrate, for anyone skilled in the art, advantageous embodiments of the invention as well as advantages to be achieved with the invention in relation to prior art.

It should be noted that although, in the following examples, the invention is primarily described in connection with a matrix sensor to be exposed and read in pixel rows, it can also be used in connection with sensors to be processed in columns or in sub-areas in another way.

DESCRIPTION OF THE DRAWINGS

In the following, the invention will be described in more detail with reference to the appended drawings, in which.

DETAILED DESCRIPTION OF THE INVENTION

Figure 1:
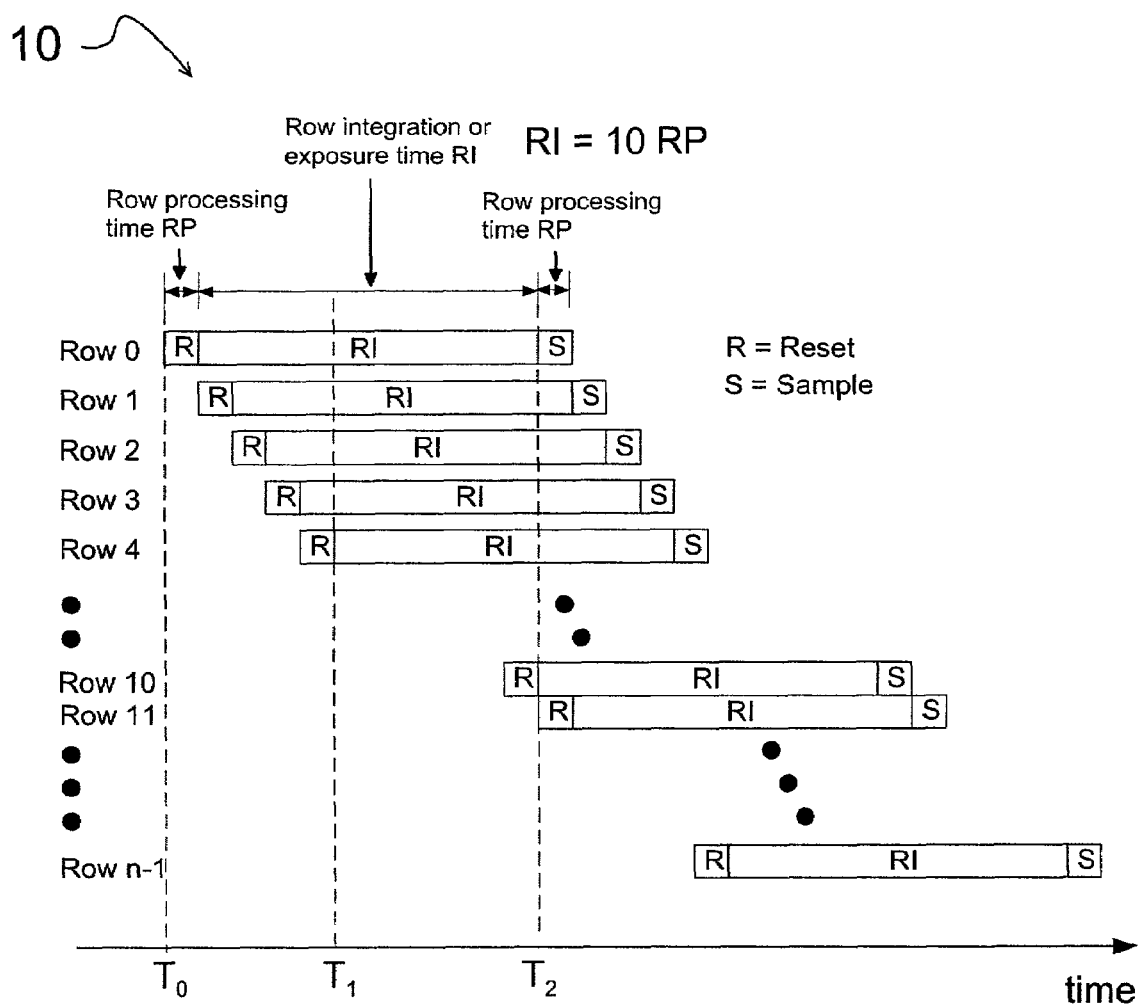
FIG. 1 illustrates, in principle, how the exposure time of a matrix sensor is controlled when using a rolling electronic shutter known from the prior art.

The operation of a rolling electronic shutter (10), shown in principle in FIG. 1, has already been discussed above in connection with the description of the prior art.

Figure 2:
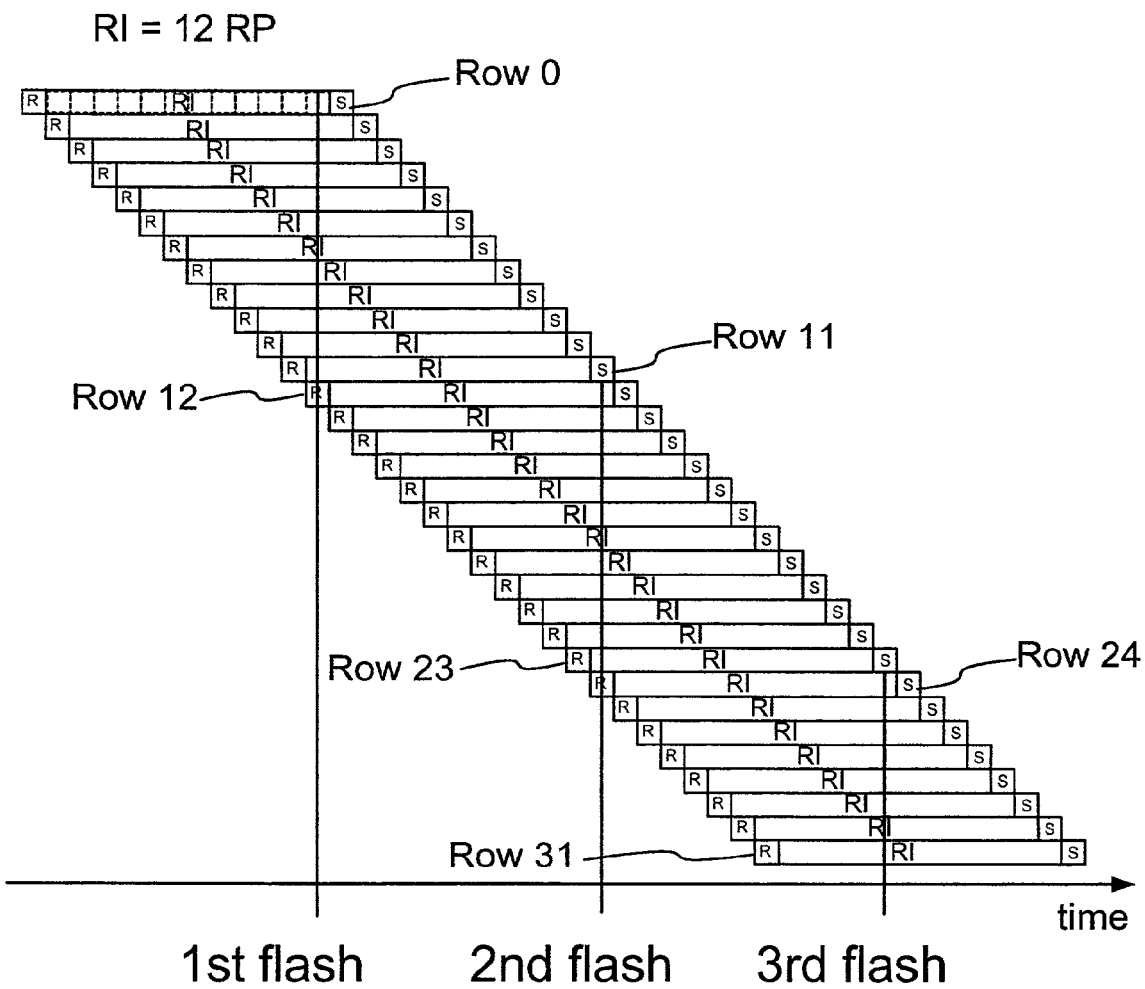
FIG. 2 shows, in principle, how the flashes of a flash unit according to the invention are timed in connection with a matrix sensor to be processed and exposed row by row as shown in FIG. 1.

FIG. 2 shows, in principle, how the flashes of an electronic flash unit (hereafter flash unit) of the invention are timed in connection with a matrix sensor to be processed and exposed row by row according to F*ig.* 1 or in a way substantially corresponding to FIG. 1.

According to FIG. 2, the start of the integration or exposure time (RI) of each pixel row in the sensor is delayed from the start of the exposure time (RI) of the preceding row by the time of the reset function (R), i.e. by the row processing time (RP). For this reason, the exposure times of successive rows are shifted with respect to each other as shown in FIG. 2.

According to the invention, the flashes of the flash unit to be used for one image are timed in such a way that each single flash of the flash unit is triggered at a point of time which is common to the integration or exposure time (RI) of as many successive rows as possible. In the case of FIG. 2, the first flash is thus timed to the point of time marked with the first vertical line, wherein the flash affects the exposure of the rows 0 to 11, but not the exposure of the other rows of the sensor. The next flash of the flash unit is timed to the point of the time marked with the second vertical line, wherein the second flash only affects the exposure of the rows 12 to 23. Thus, the second flash does not affect the exposure of the preceding rows 0 to 11 nor the exposure of the following rows, starting from the row 24. In a corresponding manner, the third flash only exposes the rows 24 to 31.

According to the invention, successive flashes are thus timed so that there is one and only one light flash during the exposure time of each pixel row 0 to 31. This is important so that the quantity of light produced by the flash at each pixel row remains substantially equal. At the same time, the minimum number of flashes required for the exposure of one image is determined, wherein the total power consumption of the flash is also minimized.

The exposure of each pixel in a single pixel row starts simultaneously after the reset function (R) to be performed for said row and ends simultaneously in the reading of the pixel values by the sample function (S). Consequently, with respect to the quantity of light received by the pixels in a single pixel row, it is not significant at which point of the integration or exposure time (RI) of said pixel row the flash occurs.

In an advantageous embodiment of the invention, the number of flashes required per one image is determined by means of the ratio between the row processing time (RP) of the matrix sensor and the integration or exposure time (RI) used in the shooting. Said ratio RI/RP indicates the number of successive rows in the matrix sensor which can always be covered by one pulse of the flash unit. In the example shown in FIG. 2, RI =12 RP and thus RI/RP =12. Thus, 12 successive rows can always be covered by means of one pulse. In the example shown in FIG. 2, where the total number of pixel rows is 32, 3 separate flash unit pulses will be required to cover these 32 rows. Correspondingly, in the situation shown in FIG. 2, RI =10 RP, wherein it would always be possible to cover 10 rows at a time by means of one flash unit pulse.

When shooting in the dark or in dim light, the exposure time (RI) can be selected to be relatively long, because under these conditions, there is no significant light other than the flash unit coming into the camera sensor. Thus, one light flash can be used to cover several pixel rows of the sensor at a time; that is, fewer flashes are required for the whole image area.

Correspondingly, under bright lighting conditions, the exposure time (RI) is selected to be shorter to prevent overexposure of the pixel rows because of the prevailing light. Thus, as the RI/RP ratio is reduced, the number of flashes required to expose the whole image area will increase.

Figure 3:
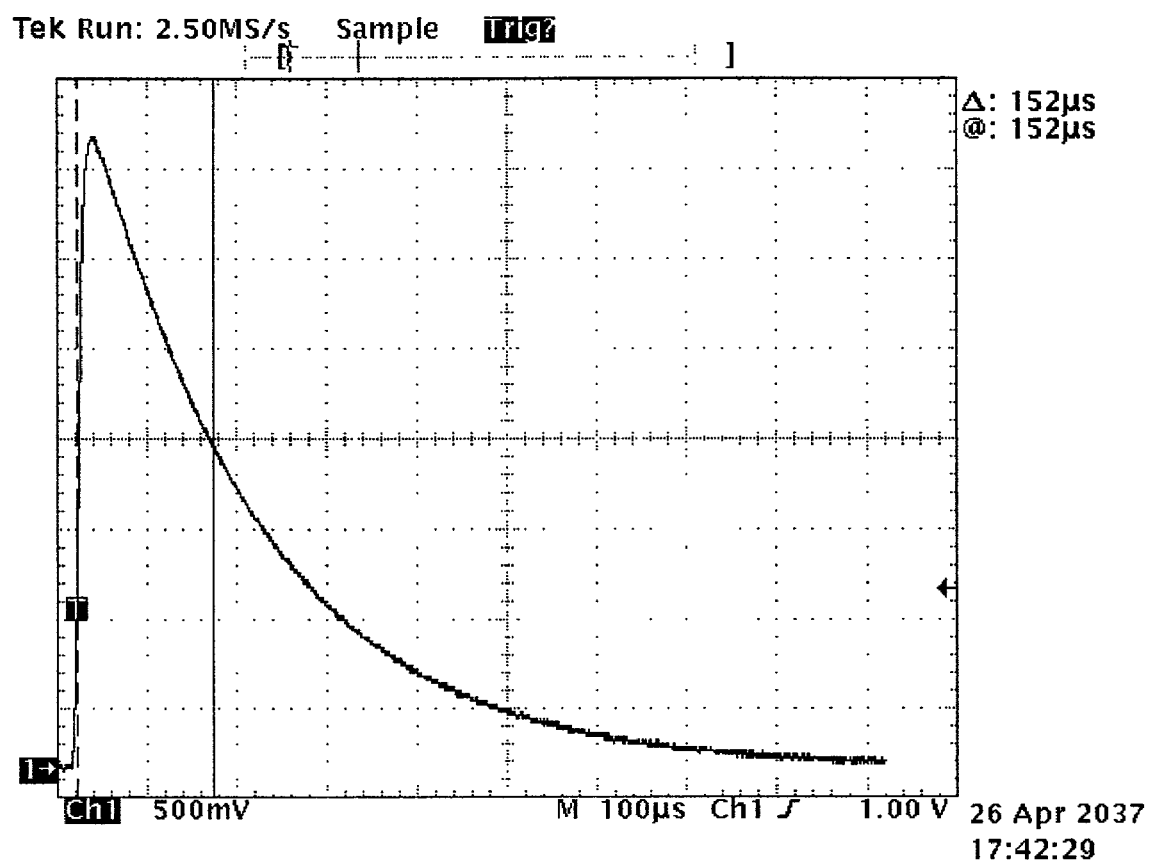
FIG. 3 shows the typical time behavior of the flash of a flash unit in a commercially available digital camera.

For the sake of illustration, FIG. 3 shows the behavior of the light flash (intensity of the light pulse) of a commercially available pocket-type digital camera (Canon QV-770) as a function of time. The graph of FIG. 3 can be considered to represent the typical operation of a flash unit based on the use of a flash tube built in a pocket-type camera or the like, the flash unit having a sufficient output capacity to be used in connection with conventional matrix sensors, such as CMOS sensors, under normal shooting conditions.

In FIG. 3, each square interval of the horizontal axis represents a time interval of 100 microseconds, and the vertical axis represents the intensity of the light flash in a relative linear scale. FIG. 3 indicates that the duration of the intensity maximum of said light flash is in the order of a few hundred microseconds.

For comparison, it can be stated that in a CMOS sensor with VGA resolution (640 ×480 pixels), to be processed (reset-integration-reading) row by row, the processing of the whole image area typically takes several tens of milliseconds. In a typical CMOS sensor, the row processing time can be e.g. about 3500 clock cycles, which corresponds to 140 microseconds if the clock cycle is 40 nanoseconds. The processing of the whole image, i.e. 480 rows, will thus take 67.2 milliseconds.

Figure 4:
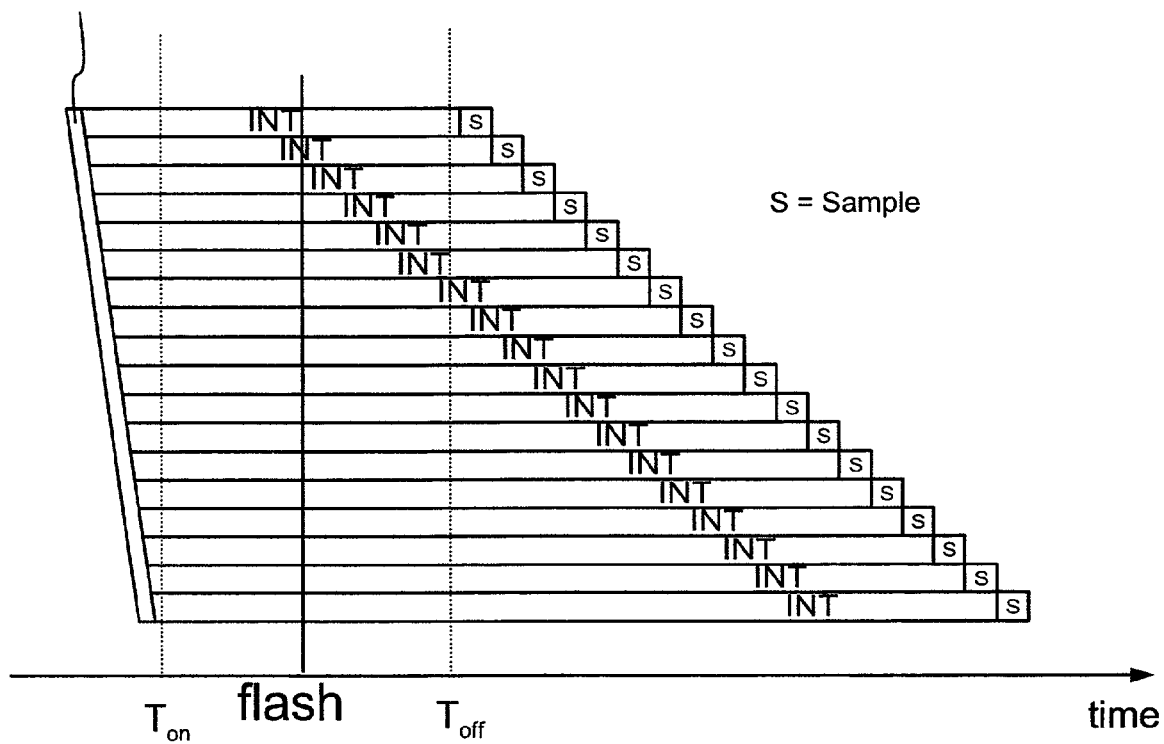
FIG. 4 illustrates, in principle, how the exposure time of a matrix sensor is controlled when using an electronic shutter function known from the prior art.

From prior art, it is known to use a sensor that is processed and exposed electronically row by row in a particular shutter mode. This principle is illustrated in FIG. 4. The following is a brief description of the operation of said shutter mode and differences between it and the present invention.

In the shutter mode of prior art, the principle is that all the pixel rows of the image sensor are set to zero by a quick reset function to start the integration time (INT) for all the rows as simultaneously as possible. After the integration time (INT) of even the last row has started, an external mechanical shutter is opened at a point of time $T_{on}$ to start the exposure of all the rows simultaneously. At the point of time $T_{off}$ the external shutter is closed, correspondingly, to terminate the exposure of all the rows simultaneously. Now, the exposure time for each sensor row thus becomes the open time $T_{off}-T_{on}$ of the external shutter. When a single light flash is placed between the moments $T_{on}$ and $T_{off}$, the light flash will have the same effect on all the pixel rows. After the external shutter has been shut, the pixel rows can be read by a sample operation at a rate which is limited by the rate of transfer of image information from said sensor circuit and which rate of transfer is thus typically significantly slower than said quick reset function. As the quick reset function and the sample function per one row have unequal lengths of time, this will result in different integration times (INT) of different pixel rows. However, when a separate external shutter is used, this will not affect the image quality, because when the shutter is shut, no light will enter the sensor and the pixels of the sensor will thus not be charged.

When imaging in the dark or in a sufficiently dim light, said shutter mode of the sensor can be used in a known manner in connection with a flash unit also without a separate external shutter in the following way.

According to FIG. 4, the flash of the flash unit illuminating the object is placed in the same way as if there were a separate external shutter used in the camera. If the light entering the sensor primarily originates from the flash only, all the rows of the sensor will be uniformly exposed even if there is no external shutter in use. However, if there is also other ambient light coming into the sensor, the last rows of the sensor will thus be exposed more than the first rows, which may, depending on the situation, result in for example the last pixel rows being saturated, i.e. overexposed. If there is ambient light present, the last rows of the sensor will be unevenly exposed due to the integration times of different lengths. Furthermore, in the case of a moving object, the image will also be blurred more at the last rows with the longer exposure time than at the first rows with the shorter exposure time.

In the solution according to the invention, the above-described problems do not occur in this way, because the exposure times (RI) of all the rows are preferably arranged to have equal lengths. For example, in the case of a mobile object, this means that the image parts corresponding to different flashes of the flash unit are not differently blurred in different image parts (different pixel rows) because of the movement, but they are only shifted with respect to each other. Such a shift is significantly easier to correct afterwards by image processing methods than artifacts caused by different exposure times of different parts in the image.

According to the invention, successive flashes synchronized with the operation of the image sensor can be triggered in a suitable way by using one or several flash units.

As the flash unit is based on an arc discharge produced in a conventional flash tube, the electric energy required for successive flashes (arc discharges) can be obtained from a single common capacitor with a sufficiently high capacity, or from another corresponding energy storage which is capable of instantaneously providing the power required for the arc discharge. One flash tube can also be supplied by several discrete capacitors or the like, each capacitor being always charged with, for example, the energy required for one flash.

Furthermore, the method according to the invention can be implemented by using several discrete flash units, each unit comprising a separate flash tube and an energy storage intended for it, or other corresponding components. The discrete flash units can be arranged to trigger flashes which are, according to the invention, timed successively in such a way that each flash unit flashes only once per each image. It is also possible to use two or more flash units together so that they flash alternately in such a way that each flash unit flashes more than once per one image. Using flash units flashing in an alternating manner provides the advantage that a single unit does not need to be capable of successive flashes at the same rate as when only one unit is used.

Instead of using a flash tube based on arc discharge, a discharge lamp or other corresponding thermal light sources, it is also possible to use non-thermal light sources to produce light pulses. Such non-thermal light sources include, for example, light emitting diodes (LED), particularly so-called super bright light emitting diodes. It is known as such that considerably higher luminosities can be instantaneously outputted by pulsing than by continuous operation of light emitting diodes. The effect of the relatively narrow spectrum band emitted by the light emitting diodes on the color balance can be compensated by using several light emitting diodes of different colors simultaneously for the illumination.

The timing of the successive light pulses, synchronized with the operation of the light sensor according to the invention, can be implemented in the system controlling the operation of the image sensor either by software or by using logic circuits or other hardware operations. The integration or exposure time (RI) may be determined, for example, on the basis of a signal from a measuring means measuring the external luminosity, wherein the ratio RI/RP between the exposure time (RI) and the processing time (RP) of a row, column or another partial area of said matrix sensor is used to determine the required number of flashes as well as their points of time during the exposure of image. On the basis of this information, one or more flash units are controlled to produce the flashes at the right time.

The information about the number of flashes used for one image and about the exact points of time of the flashes can be further utilized in the post-processing of the image produced by the image sensor. Said post-processing is preferably performed in connection with the digital camera function in the same device immediately after taking the picture.

Post-processing can be used for example for correcting a shift between image parts corresponding to different flashes, which shift is caused by the movement of the object to be imaged during the time between successive flashes of the flash unit. In the correction, the image sub-areas to be transferred in relation to each other are determined in such a way that one area to be shifted substantially as a whole in relation to the other sub-areas always consists of the part of the image area stored (exposed) during one flash. By using various image processing methods, such as movement estimation, during the post-processing, said different parts of the image area can be aligned with each other on the pixel level in such a way that the effect of shifts caused by movement of the image is eliminated or significantly reduced in the corrected image.

Post-processing of the image, which utilizes the number and exact points of time of light flashes, can also be applied in the case of several images stored in succession. One possible use of the invention is the storage of so-called super-resolution images. In super-resolution images, several successive images in which the object is slightly shifted with respect to the image area are combined by means of image processing into a single new image. The resolution of the combined image can thus be made better than the pixel resolution of the original images in a way known as such.

When forming super-resolution images by using flash unit timing according to the invention, several images are stored in succession, in which the different image parts corresponding to single light flashes are now imaged in a good quality manner under similar lighting conditions and without an artifact caused by the movement of the object. The good quality partial images can be combined in the above-described manner into successive good quality images. These images can further be combined, by using image processing methods known as such, into a super-resolution image having a better pixel resolution than a single image. The single images can be considered to represent the object to be imaged from a slightly different camera angle, wherein by combining information contained in several images it is possible to achieve an image whose information content exceeds the information content of a single image.

The combination of single images taken of an object in succession from slightly different camera angles and/or in different positions of the object is prior art known as such. The invention makes it possible to use a flash unit in connection with taking super-resolution pictures, which improves the definition of the image by eliminating artifacts which are otherwise due to long exposure time and movement. Super-resolution imaging can be used, for example, in the conversion of paper documents into electrical format with a good pixel resolution.

The invention has been described above by using a few selected examples. However, it is naturally obvious that the above-presented examples must not be interpreted as the only possible embodiments of the invention, but the embodiments of the invention can be freely varied within the scope of the inventive features presented in the claims below.

The invention claimed is:

1. A method for controlling a flash unit used for illuminating an object to be imaged in connection with an electronic image sensor based on a 2-dimensional pixel matrix, the electronic image sensor having a plurality of discrete sub-areas that combine to form an image area, wherein an exposure of the image sensor to form one image is performed by exposure of all of the sub-areas by using a rolling electronic shutter, wherein the exposure of at least some of said sub-areas takes place at different times during a time of exposure of said one image, and further wherein, several discrete, successive flashes of the flash unit are used to achieve even exposure of the image area, which flashes are timed in such a way that each single flash is performed at a point of time which is common to an integration or exposure time of as many successive sub-areas greater than one of the image sensor as possible, and that the successive flashes of the flash unit are also timed in such a way that one and only one flash of the flash unit occurs during the integration or exposure time of each single sub-area.

2. The method according to claim 1, wherein the control of the flash unit is applied in connection with an image sensor to be exposed pixel row by pixel row, wherein the number of pixel rows to be simultaneously covered by one light flash is determined from the ratio between the integration or exposure time of a single pixel row and a processing time of a single pixel row, which pixel row processing time indicates the time taken for a pixel row reset function and/or read function, and which exposure time and processing time are substantially equal for all pixel rows.

3. The method according to claim 1, wherein the control of the flash unit is applied in connection with an image sensor to be exposed pixel column by pixel column, wherein the number of pixel columns to be simultaneously covered by one light flash is determined from the ratio between the integration or exposure time of a single pixel column and a processing time of a single pixel column, which pixel column processing time indicates the time taken for a pixel column reset function and/or read function, and which exposure time and processing time are substantially equal for all pixel columns.

4. The method according to claim 1, wherein successive flashes of the flash unit, required for one image, are triggered by using one or several discrete flash units.

5. The method according to claim 4, wherein the successive flashes of the flash unit, required per one image, are triggered as alternating flashes of two or more flash units.

6. The method according to claim 4, wherein a single flash unit is based on the use of a flash tube, a discharge lamp or another corresponding thermal light source.

7. The method according to claim 4, wherein a single flash unit is based on the use of a light emitting diode or another corresponding non-thermal light source.

8. The method according to claim 1, wherein the control of the flash unit is applied for producing a fill-in flash in camera shooting under illuminated conditions.

9. The method according to claim 1, wherein an image taken by using the flash unit and stored in electrical format is subjected to post-processing to improve image quality by utilizing information about the size of image sub-areas corresponding to successive separate flashes of the flash unit.

10. The method according to claim 9, wherein the post-processing is used to correct a shift caused between said sub-areas due to the movement of the object to be imaged.

11. The method according to claim 9, wherein two or more images taken in succession are subjected to post-processing by combining them into a single super-resolution image by image processing.

12. The method according to claim 1, wherein the flash unit control is applied in a digital camera function implemented in or in connection with a portable, battery-operated device.

13. The method according to claim 12, wherein the flash unit control is applied in a mobile station.

14. A device for controlling a flash unit used for illuminating an object to be imaged in connection with an electronic image sensor based on a 2-dimensional pixel matrix, the electronic image sensor having a plurality of discrete sub-areas that combine to form an image area, wherein the device is arranged to perform an exposure of the image sensor to form one image by exposure of all of the sub-areas by using a rolling electronic shutter, wherein the exposure of at least some of said sub-areas takes place at different times during a time of exposure of said one image, said device being further arranged to use several discrete, successive flashes of a flash unit to achieve even exposure of the image area, and the device being further arranged to time the flashes in such a way that the device is able to perform each single flash at a point of time which is common to the integration or exposure time of as many successive sub-areas greater than one of the image sensor as possible, and that the device is arranged to time the successive flashes of the flash unit in such a way that one and only one flash of the flash unit occurs during the integration or exposure time of each single sub-area.

15. The device according to claim 14 being arranged to apply the control of the flash unit in connection with an image sensor to be exposed pixel row by pixel row, and further to determine the number of pixel rows to be simultaneously covered by one light flash from the ratio between the integration or exposure time of a single pixel row and a processing time of a single pixel row, which pixel row processing time indicates the time taken for a pixel row reset function and/or read function, and which exposure time and processing time are substantially equal for all pixel rows.

16. The device according to claim 14 being arranged to apply the control of the flash unit in connection with an image sensor to be exposed pixel column by pixel column, and further to determine the number of pixel columns to be simultaneously covered by one light flash from the ratio between the integration or exposure time of a single pixel column and a processing time of a single pixel column, which pixel column processing time indicates the time taken for a pixel column reset function and/or read function, and which exposure time and processing time are substantially equal for all pixel columns.

17. The device according to claim 14, wherein the image sensor is based on complimentary metal oxide semiconductor technology.

18. The device according to claim 14, being a portable, battery-operated device comprising means for digital camera functions.

19. A computer program product for controlling a flash unit used for illuminating an object to be imaged in connection with an electronic image sensor based on a 2-dimensional pixel matrix, the electronic image sensor having a plurality of discrete sub-areas that combine to form an image area, comprising code means stored on a readable medium and adapted, when run on a computer, to perform an exposure of the image sensor to form one image by exposure of all of the sub-areas by using a rolling electronic shutter, wherein the exposure of at least some of said sub-areas takes place at different times during a time of exposure of said on image, and further,
  to use several discrete, successive flashes of a flash unit to achieve even exposure of the image area, which flashes are
  timed in such a way that each single flash is performed at a point of time which is common to the integration or exposure time of as many successive sub-areas greater than one of the image sensor as possible, and that the successive flashes of the flash unit are
  also timed in such a way that one and only one flash of the flash unit occurs during the integration or exposure time of each single sub-area.

20. A method comprising:
  providing several discrete, successive flashes of a flash unit to illuminate an object to be imaged by an electronic image sensor having a 2-dimensional pixel matrix that forms an image area, wherein the image area comprises a plurality of discrete sub-areas that combine to form said image area, wherein the successive flashes are provided so as to evenly expose the image area of an electronic image sensor, and
  timing said successive flashes in such a way that each single flash is performed at a point of time which is common to an integration or exposure time of as many successive sub-areas greater than one of the image sensor as possible and so that one and only one flash of the flash unit occurs during the integration or exposure time of each single sub-area.

21. The method according to claim 20, wherein said sub-areas are each pixel rows of said two-dimensional pixel matrix and wherein each successive flash of the flash unit simultaneously exposes a number of pixel rows.

22. The method according to claim 21, wherein said number of pixel rows is determined from the ratio between the integration or exposure time of a single pixel row and a processing time of a single pixel row, which pixel row processing time indicates the time taken for a pixel row reset function and/or read function, and which exposure time and processing time are substantially equal for all pixel rows.

23. The method according to claim 20, wherein said sub-areas are each pixel columns of said two-dimensional pixel matrix and wherein each successive flash of the flash unit simultaneously exposes a number of pixel columns.

24. The method according to claim 23, wherein said number of pixel columns is determined from the ratio between the integration or exposure time of a single pixel column and a processing time of a single pixel column, which pixel column processing time indicates the time taken for a pixel column reset function and/or read function, and which exposure time and processing time are substantially equal for all pixel columns.

25. The method according to claim 20, further comprising storing data corresponding to the exposed image area of the electronic image sensor and post-processing the stored data so as to improve image quality by utilizing information about the size of said sub-areas corresponding to the successive flashes.

26. The method according to claim 25, wherein the post-processing is used to correct a shift caused between said sub-areas due to the movement of the object to be imaged.

27. The method according to claim 25, wherein two or more images taken in succession are subjected to post-processing by combining them into a single super-resolution image by image processing.

* * * * *